(No Model.)
A. FISCUS.
GARDEN CULTIVATOR.
No. 602,285. Patented Apr. 12, 1898.
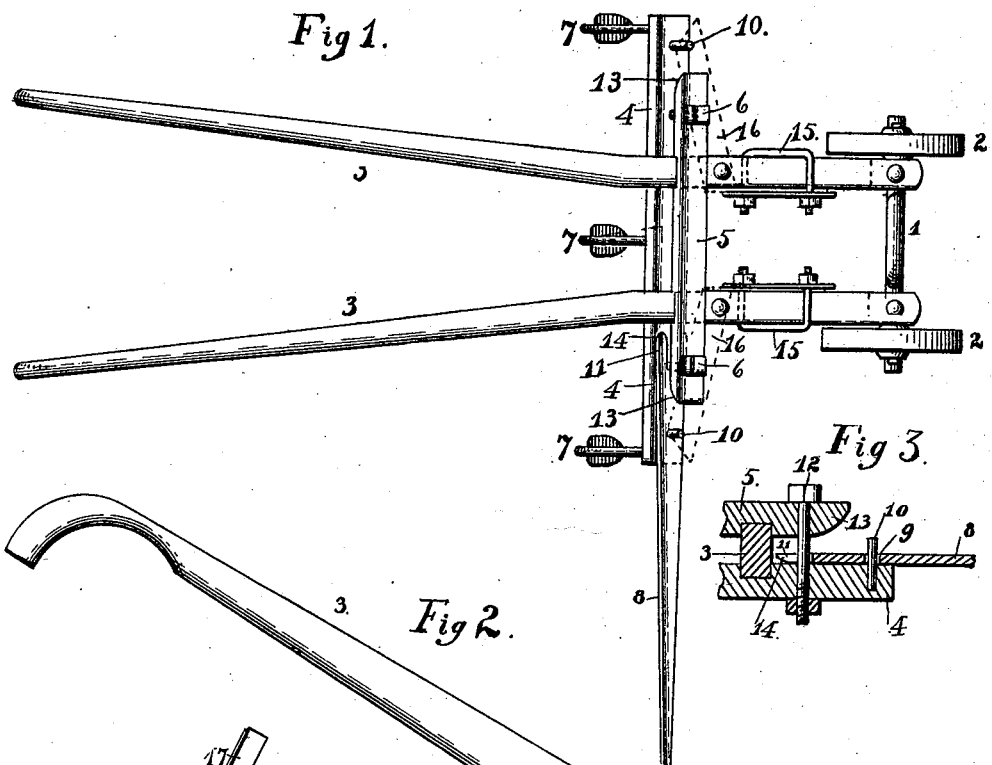
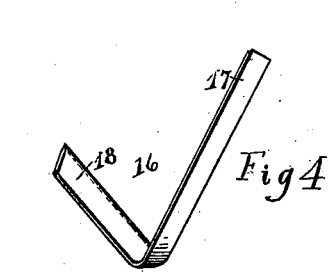
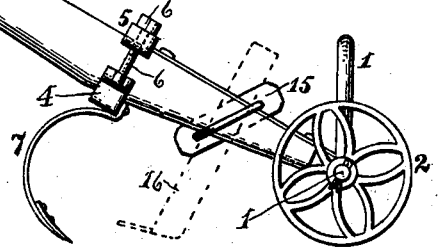
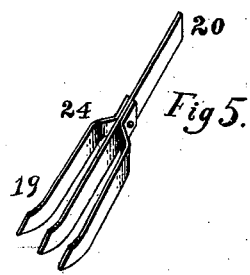
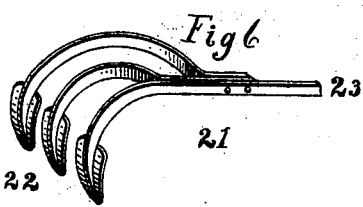
Witnesses
Inventor
Adam Fiscus
by F. B. Brock
Attorney

UNITED STATES PATENT OFFICE.

ADAM FISCUS, OF FISCUS, IOWA.

GARDEN-CULTIVATOR.

SPECIFICATION forming part of Letters Patent No. 602,285, dated April 12, 1898.

Application filed September 20, 1897. Serial No. 652,286. (No model.)

*To all whom it may concern:*

Be it known that I, ADAM FISCUS, of Fiscus, county of Audubon, and State of Iowa, have invented a new and useful Garden-Cultivator; and I do declare the following to be a full, clear, and exact description of the invention, such as will enable others skilled in the art to which it appertains to make and use the same, reference being had to the figures marked on the accompanying drawings, which form a part of this specification.

Figure 1 represents a plan view of a cultivator embodying my invention. Fig. 2 is a side elevation thereof. Fig. 3 is a detailed section on an enlarged scale, partly broken away, hereinafter referred to. Fig. 4 is a perspective view of one of the tools used by my cultivator. Fig. 5 is a perspective view of another tool used by the cultivator. Fig. 6 is a perspective view of still another tool which I use upon my machine.

My invention relates to cultivators.

The object of my improvements is to construct more particularly a hand wheeled cultivator which will perform a variety of work.

In the drawings, 1 represents the axle of the cultivator, having wheels 2 at each end. This axle is provided intermediately with a central arch in the usual way, so that when desired a row of plants may pass under the arch and the soil be cultivated on each side thereof.

3 represents the handles of my cultivators, secured in any suitable way to the axle 1, preferably at each side of the arch.

4 represents a movable beam to be secured to the handles 3, preferably by mortises, and I provide a similar beam 5, embracing the opposite sides of the handles. Bolts 6 secure the beams 4 and 5 rigidly in position upon the handles. The details of this removable beam-clamping device may be varied. When in place, as shown in Figs. 1 and 2, the beam 4 carries a gang or series of cultivators 7, preferably of the shovel form. The position and number of these shovels may be varied. In the drawings I have shown three cultivators; but it is obvious that changes may be made. The central shovel, for instance, may be removed and the outer shovels brought in, so as to work closer together.

Instead of removing the beam 4, if desired, the cultivators 7 themselves may be removed and the beam left in position, so that the marker device hereinafter described may be used at all times. The gang-shovels 7 upon the removable beam, the hoes or weeder 16, the onion-cultivators 24, and the gang-cultivators 21 are used upon my machine in accordance with the work required to be done, the season of the year, and the condition of the crop.

8 is the marker, which is provided with a hole 9, adapted to be placed over the pin 10 on the beam 4, its inner end being slitted or bifurcated at 11, so as to slip over the bolt 12, which clamps the beams 4 and 5 together. The outer ends of the clamp-beam 5 and the inner under edge of the marker 8 are beveled, respectively, at 13 and 14, in order to facilitate the entrance and removal of the marker upon either side of the beam 4, according as it is desired to use the marker 8 upon one side or the other. An attaching-clip for the marker is thus provided at each end of the gang-beam 4.

When it is desired to remove the gang-cultivator 7 and use either of the tools shown in Figs. 4, 5, and 6, the shackle or clip device 15 is employed. There is one of these shackles upon each side of the cultivator, and duplicates of the tools shown in Figs. 4, 5, and 6 are used.

Fig. 4 shows a hoe or coverer-tool 16, having a shank 17 and a covering-blade 18. The position of the tool 16 is shown by the dotted lines in Figs. 1 and 2. They are adapted more particularly in covering up the seed in the furrows.

The tool 24 (shown in Fig. 5) is more particularly adapted to cultivating onions, but may be used for any purpose desired. It consists of gang 19 and a shank 20 and is adapted to be secured to the shackles 15 (there being two of them) like that of tool 16.

The gang-cultivator 21 (shown in Fig. 6) is adapted also to be used in connection with the shackles 15. It consists of a gang of shovels 22 and the shank 23, which may be secured to the shackle 15 in any suitable way—for instance, by a pivoted link connection which will permit both lateral and vertical adjustment.

The handles 3 may be varied in shape and design as use may require or the particular work demand.

The method of securing the beam 4 upon either side may be varied.

The cultivators or shovels 7 may be carried by the clips 15 in pairs, while the marker device is secured to the beams 4 5.

What I claim, and desire to secure by Letters Patent, is—

In a wheeled hand cultivator, the combination of the axle-wheels and cultivator-handles, a removable gang-beam secured rigidly to both of said handles, an attaching-clip at each end of the gang-beam upon either side of the cultivator, and an attaching shackle or clip adapted for use upon the cultivator forward of the gang-beam, substantially as described.

In testimony whereof I have hereunto set my hand and affixed my seal this 10th day of September, 1897.

ADAM FISCUS. [L. S.]

Witnesses:
 Roy Fiscus,
 Mert. Fiscus.